United States Patent Office 2,861,995
Patented Nov. 25, 1958

2,861,995

PROCESS FOR THE CONVERSION OF ETHANOLAMINE

Gordon F. MacKenzie, Midland, Mich., assignor to The Dow Chemical Company, Midland, Mich., a corporation of Delaware No Drawing. Application April 27, 1956
Serial No. 581,009

5 Claims. (Cl. 260—268)

This invention relates to the conversion of ethanolamine in the manner of a continuous process into useful and desirable multiple-nitrogen-containing products including ethylene diamine and piperazine.

It is an object of the invention to provide a practicable and efficient process, adapted for utilization on a continuous basis, for converting ethanolamine in substantial quantities into useful multiple-nitrogen-containing products. It is also an object of the present invention to provide a facile and exceptionally flexible process for converting ethanolamine into predeterminable proportions of various multiple-nitrogen-containing products in order to possibilitate a quick and ready response to changing market demands for the commodities that are being manufactured without requiring extensive revisions and alterations in the process and apparatus requirements that are involved. A further object is to provide a continuous process for converting ethanolamines into multiple-nitrogen-containing products that are easily separable from the mass of converted starting material. Other objects and advantages will hereinafter be apparent.

According to the invention, ethanolamine may be converted at substantial and significant rates and in a continuous fashion by passing a stream of ethanolamine and ammonia, wherein the molar ratio of ammonia to ethanolamine is at least about 3:1, respectively, under pressure, which advantageously may be a pressure between about 1,000 and 2,500 pounds per square inch, over a fixed bed of a metal hydrogenation catalyst while being maintained at an elevated temperature, which advantageously may be a temperature between about 150° and 225° C., to convert the ethanolamine into multiple-nitrogen-containing products; withdrawing a stream comprised of the converted ethanolamine from the fixed bed of catalyst; and separating the multiple-nitrogen-containing products from the stream of the converted ethanolamine. Single pass conversions of the ethanolamine over the catalyst bed that are in the neighborhood of 70–80 percent may, surprisingly enough, be readily achieved with relatively brief residence periods for the ethanolamine over the catalyst bed.

Ethylene diamine, piperazine and diethylene triamine are the useful and desirable multiple-nitrogen-containing products that may be obtained readily by the continuous conversion of ethanolamine according to the process of the invention. The amount of piperazine product that may be obtained in the process may be varied in a predeterminable manner over a wide range in which as much as 30 percent or more of the ethanolamine that is converted in a single pass may consist of piperazine. Relatively higher temperatures and lower proportions of ammonia to ethanolamine at given temperatures (which beneficially are within the ranges indicated to be advantageous), as well as the employment of relatively greater quantities of the catalyst with given ethanolamine feed rates or the effectuation of relatively longer catalyst contact times, favor the realization of relatively greater quantities of piperazine in the converted ethanolamine product. By way of illustration, when a pressure in the neighborhood of 2,000 pounds per square inch, a temperature near 200° C. and a mole ratio of ammonia to ethanolamine of at least about 5:1, respectively, is employed, it is frequently possible to obtain a yield of 25–30 percent or more of piperazine in the converted ethanolamine product. Conversely, the amount of piperazine yield may be reduced almost to the vanishing point, if it is undesirable for any reason to obtain such a product at the expense of higher ethylene diamine yields, by utilizing lower temperatures, greater quantities of ammonia and lesser relative amounts of the catalyst or shorter catalyst contact times. Generally, between about 5 and 20 percent of the converted ethanolamine may be obtained as diethylene triamine, depending on the particular conditions that may be involved.

The metal hydrogenation catalyst that is utilized in the practice of the invention may advantageously be comprised of nickel, cobalt, copper chromite and the like as well as certain of the catalytic noble metals such as platinum and palladium, including supported forms of the catalytic metals on such conventional carriers as alumina, finely divided silica and the like. Raney nickel and Raney cobalt may be utilized with especial advantage. It is generally beneficial to employ at least about a pound of the metal catalyst in the fixed bed for each three to four pounds of the ethanolamine being converted per hour. When greater amounts of piperazine are desired to be obtained in the converted ethanolamine product, it may be more desirable to employ about one pound of the metal catalyst for each one of two pounds of ethanolamine being passed per hour over the fixed bed. The residence or contact time of the ethanolamine with the fixed bed of catalyst is usually less than an hour, and may frequently be less than one-half hour, although this may vary with changes in the other operating conditions, such as the operating pressure and temperature and the relative quantity of the catalyst which is available for the conversion.

The multiple-nitrogen-containing products may be separated from the stream of converted ethanolamine being withdrawn from the catalyst bed by various techniques that are apparent to those skilled in the art. Usually they may be separated by distillation. Although any desired or required combination of condensation, solvent extraction, distillation and precipitation and the like may be employed for the isolation and purification of the various products.

By way of further illustration, about 3.1 pounds of Raney nickel catalyst was provided in a fixed catalyst bed in a cylindrical reactor having a length of the catalyst packing of about 23 inches and an internal diameter of about 2 inches. A stream comprised of about 2.2 pounds per hour of ethanolamine, which also contained about 3.5 moles of ammonia for each mole of ethanolamine in the stream, was continuously passed over the catalyst under an average pressure of about 1,950 pounds per square inch at an average temperature of about 195° C. The single pass residence time of the ethanolamine being converted over the catalyst bed was about 26 minutes. About 75 percent by weight of the ethanolamine was continuously converted to various multiple-nitrogen-containing products from which an average yield of about 24.1 percent of ethylene diamine, 29.8 percent of piperazine and 14.52 percent of diethylene triamine were continuously obtained. The individual products were separated and recovered by distillation through a packed column of the stream of converted ethanolamine that was being withdrawn from the catalyst bed after the unreacted ammonia had been stripped therefrom.

When the reaction was conducted in a continuous manner similar to the foregoing, using the same reactor provided with the same quantity of the Raney nickel catalyst in the fixed bed excepting that the temperature was about 160–170° C., the ethanolamine feed rate was about 1.6 pounds per hour and the mole ratio of ammonia to ethanolamine in the feed was about 3.3:1, a yield of about 12.5 percent of the converted ethanolamine was obtained as piperazine while the yields of ethylene diamine and diethylenetriamine was about 50.5 and 9.3 percent, respectively.

In another similar run with an ethanolamine feed rate of about 2.64 pounds per hour, an ammonia to ethanolamine ratio of about 5.6:1 respectively, and average pressure and temperature conditions of about 1500 pounds per square inch and 165° C., respectively, the yield of piperazine obtained from the converted ethanolamine was practically nil, whereas about a 60.8 percent yield of ethylene diamine and a 16.34 percent yield of diethylene triamine was realized from the converted feed material. In all cases a certain portion of the ethanolamine was converted to higher amines. Conditions favoring greater conversions to piperazine also tend to minimize the production of higher amine products.

In many cases it may be advantageous to recycle the unreacted starting materials including both the ammonia and ethanolamine. In this way greater overall conversions of the starting materials may be achieved and greater efficiencies and economies may be realized in the operation.

In comparison with the foregoing, when analogous reactions of ethanolamine were conducted according to conventional batch-wise procedures using pressure bomb apparatus and the same catalyst with similar reaction conditions, the greatest conversions that were achieved within time periods of about an hour were only in the neighborhood of about 30–35 percent.

What is claimed is:

1. Continuous process for the conversion of ethanolamine into multiple-nitrogen-containing products that are selected from the group consisting of ethylene diamine, polyethylene polyamines and piperazine which comprises continuously passing a stream of ethanolamine and ammonia, wherein not more than 4 unit weight parts per hour of ethanolamine are contained and the molar ratio of ammonia to ethanolamine is at least about 3:1, respectively, under pressure of between about 1,000 and 2,500 pounds per square inch over a fixed bed containing about one part by unit weight of a metal hydrogenation catalyst selected from the group consisting of nickel, cobalt, copper chromite, platinum and palladium hydrogenation catalysts while said stream is being maintained at an elevated temperature of between about 150 and 225° C. and the residence time of the ethanolamine being converted with the fixed bed of catalyst does not exceed about an hour to convert the ethanolamine into said products; continuously withdrawing a stream comprised of the converted ethanolamine from the fixed bed of catalyst; and thereafter separating the nitrogen-containing products from the stream of the converted ethanolamine.

2. The method of claim 1, wherein the catalyst is Raney nickel.

3. The method of claim 1, wherein about a pound of the catalyst is employed in the fixed bed for each three to four pounds of the ethanolamine being converted.

4. The method of claim 1, wherein the ratio of ammonia to ethanolamine is at least about 5:1, respectively, and wherein relatively higher temperatures and lower pressures within the indicated ranges are employed while using about a pound of catalyst in the fixed bed for each one to two pounds of ethanolamine being passed per hour over the fixed bed of catalyst to convert said ethanolamine into maximum proportions of piperazine in the multiple-nitrogen-containing products that are obtained.

5. The method of claim 1, wherein at least about 70 percent of the ethanolamine is converted to multiple-nitrogen-containing products during a single pass of said stream over said fixed bed of catalyst.

References Cited in the file of this patent

UNITED STATES PATENTS 2,519,560     Fowler _____ Aug. 22, 1950

OTHER REFERENCES

Fieser et al.: Organic Chemistry, second edition (1950), pp. 66–68, 83, 107–108, 179 and 227.